US008279833B2

(12) United States Patent
Kang et al.

(10) Patent No.: US 8,279,833 B2
(45) Date of Patent: Oct. 2, 2012

(54) MOBILE NETWORK SYSTEM AND METHOD FOR PROCESSING IP HANDOFF THEREOF

(75) Inventors: Sung Soo Kang, Daejeon (KR); Sang Kwon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 584 days.

(21) Appl. No.: 12/518,609

(22) PCT Filed: Oct. 29, 2007

(86) PCT No.: PCT/KR2007/005340
§ 371 (c)(1),
(2), (4) Date: Jun. 10, 2009

(87) PCT Pub. No.: WO2008/072837
PCT Pub. Date: Jun. 19, 2008

(65) Prior Publication Data
US 2010/0020766 A1 Jan. 28, 2010

(30) Foreign Application Priority Data

Dec. 11, 2006 (KR) ........................ 10-2006-0125834
Apr. 4, 2007 (KR) ........................ 10-2007-0033301

(51) Int. Cl.
*H04W 4/00* (2009.01)
(52) U.S. Cl. ...................................... 370/331; 370/400
(58) Field of Classification Search .................. 370/400, 370/331
See application file for complete search history.

(56) References Cited

U.S. PATENT DOCUMENTS

| 5,867,765 | A | 2/1999 | Nilsson |
| 5,884,164 | A | 3/1999 | Gerard et al. |
| 6,119,005 | A | 9/2000 | Smolik |
| 6,473,413 | B1* | 10/2002 | Chiou et al. ................. 370/331 |
| 2001/0036834 | A1 | 11/2001 | Das et al. |
| 2002/0085518 | A1* | 7/2002 | Lim ............................. 370/331 |
| 2003/0145038 | A1* | 7/2003 | Bin Tariq et al. ............. 709/202 |
| 2005/0128979 | A1 | 6/2005 | Wu et al. |
| 2007/0021117 | A1* | 1/2007 | McKenna et al. ............. 455/431 |
| 2008/0069030 | A1 | 3/2008 | Hirano et al. |

FOREIGN PATENT DOCUMENTS

JP 2006-114946 4/2006

(Continued)

OTHER PUBLICATIONS

Prasan De Silva, et al., "A Mobility Management Protocol for IP-Based Cellular Networks," IEEE Wireless Communications (Mobile and Wireless Internet), Jun. 2002, pp. 31-37.

(Continued)

*Primary Examiner* — Sai-Ming Chan
(74) *Attorney, Agent, or Firm* — Staas & Halsey LLP

(57) ABSTRACT

Provided are a mobile network system capable of processing a high-speed handoff by dividing into a data packet path between mobile nodes and a handoff packet path of the mobile node, and a method for processing IP handoff thereof. The system includes a MAP broadcasting a handoff registration request and reply between a foreign agent and a home agent, and an additional handoff signal path between the MAP and a mobile agent operating as a foreign agent and a home agent by means of a HAAP and VPN technology to be physically distinguishable from a data path. Therefore, limitation in a head of line can be resolved and the IP handoff can be promptly provided.

23 Claims, 12 Drawing Sheets

FOREIGN PATENT DOCUMENTS

| | | |
|---|---|---|
| JP | 2006-121647 | 5/2006 |
| KR | 10-2003-0017194 | 3/2003 |
| KR | 10-2004-0103243 | 12/2004 |
| KR | 10-2005-0062798 | 6/2005 |
| KR | 10-2006-0067074 | 6/2006 |
| KR | 10-2007-0034542 | 3/2007 |

OTHER PUBLICATIONS

Shingo Ohmori, et al., "The Future Generation of Mobile Communications Based on Broadband Access Technologies," IEEE Communications Magazine (Broadband Access Technologies), Dec. 2000, pp. 134-142.

Goran M. Djuknic, et al., "Establishing Wireless Communications Services via High-Altitude Aeronautical Platforms: A Concept Whose Time Has Come?" IEEE Communications Magazine, Sep. 1997, pp. 128-135.

Won-Soo Jung, et al., "An Enhanced Indirect Handoff for Cellular IP Network," KICS, Jan. 2006, vol. 31, No. 1B.

*International Search Report and Written Opinion* (Forms PCT/ISA/210 and PCT/ISA/237) for International Application No. PCT/KR2007/005340, mailed Oct. 29, 2007.

\* cited by examiner (a)

(b)

MOBILE NETWORK SYSTEM AND METHOD FOR PROCESSING IP HANDOFF THEREOF

CROSS REFERENCE TO RELATED PATENT APPLICATIONS

This application claims the benefit under 35 U.S.C. Section 371, of PCT International Application No. PCT/KR2007/005340, filed Oct. 29, 2007, which claimed priority to Korean Application No. 10-2006-0125834, filed Dec. 11, 2006, and Korean Application No. 10-2007-0033301, filed Apr. 4, 2007 in the Korean Intellectual Property Office, the disclosures of all of which are hereby incorporated by reference.

TECHNICAL FIELD

The present invention relates to a mobile network system capable of allowing continuous mobile communication regardless of movements of a mobile node (also, referred to as an MN), and a method for processing IP handoff of the mobile network system.

BACKGROUND ART

In mobile data communications, when a mobile node moves from one mobile communication region to another mobile communication region, handoff technology is required to allow the continuous mobile data communication. Examples of handoff for mobile IP are intra-subnet handoff, inter-subnet handoff, and inter-router handoff.

According to these handoffs, since the intra-subnet handoff where a mobile node moves into an adjacent cell corresponding to an administration address region of the same router uses the same IP subnet address, a new IP subnet address is not required.

On the contrary, in a case of the inter-subnet handoff and inter-router handoff where the administration address region of the router changes, a new IP subnet address is required in a moving mobile node. That is, when a mobile node visits another region with a different IP address in a mobile IP network, a foreign agent (also, referred to as a FA) operating as a virtual router in the another region provides a care-of-address (CoA) to the mobile node, and the mobile node registers the CoA in a home agent through the foreign agent. The home agent encapsulates data transmitted toward the mobile node and transmits the encapsulated data as the CoA, and then the foreign agent unpacks the data and outputs the unpacked data into the mobile node. At this point, the foreign agent operates as a default router of the mobile node for the data that is transmitted by the mobile node. When the handoff requiring an address change occurs, a new CoA is required for a mobile node. Accordingly, an additional method for processing a mobile IP is required.

On the other hand, if a mobile node moves into an adjacent cell, handoff of a link level occurs between stations (Base Transceiver Station (BTS) of Global System for Mobile communications (GSM) or BS of Code division multiple access (CDMA)). This high-speed handoff of a link level has various preventive measures such as soft handoff, etc. The conventional handoff broadcasts the handoff over the cell with the mobile node and adjacent cells. As a result, communication resources are wasted, and a packet delivery is delayed because an operation for correcting the mobile node's position information is required in advance. Thus, there is some difficulty in directly applying this method to the mobile node providing an IP service.

There have been various proposals in resolving the above limitation. For example, referring to U.S. Patent publication No. 2001/0036834 A1 (2001. 11. 1), when a mobile node notifies a subnet agent that a handoff operation may occur, the subnet agent delivers this to a mobile agent (including a home agent and a foreign agent), and the mobile agent determines subnet agents adjacent to a subnet agent with the mobile node and sets the adjacent subnet agents as a multicast group. That is, according to the above proposed method, high-speed handoff can be obtained by multicasting packets that need to be delivered to the mobile node.

However, according to the conventional proposal, resource waste may still occur because the data packet is delivered to an unnecessary subnet agent during a predetermined time. Additionally, since a control signal path for the handoff is identical to a data path used for delivering the data packet to the mobile node, the control signal packet is followed by the data packet in a buffer. As a result, hand-of-line blocking phenomenon occurs because the control signal packet is processed later on.

According to another method, as being discussed in Internet Engineering Task Force (IETF), a gateway foreign agent (GFA) maybe introduced as upper level of the level of the foreign agents with respectively different address regions, such that the mobile node utilizes the CoA provided from the GFA. However, this method may not be directly applied to conventional mobile nodes that do not identify the GFA.

Additionally, although the GFA is used, in a case of when a control signal packet for processing handoff and data packet between mobile nodes are utilizing the same path, as described before, head-of-line blocking phenomenon, i.e., property of the IP network, still exists. Additionally, the mobile node needs to be registered as a conventional normal home agent and as the GFA even if the GFA exits.

To compensate the above limitations, when the mobile node requests registration to a home agent through a foreign agent, an IP address of the GFA is added to an extension field of a registration request message in the mobile node, which is transmitted from the foreign agent, by placing the GFA between the foreign agent and the home agent. Additionally, when the mobile node moves from the foreign agent in area A from the foreign agent in area B, the GFA returns back a response message if the mobile node is registered mobile node when identifying the registration request. In a case when the mobile node is not registered, the GFA generates and adds a new visitor entry to a visitor list inside the GFA and also delivers registration request message to the home agent of the mobile node by adding an IP address of the GFA to the extension filed of the registration request message in the mobile node moving from the foreign agent of the region B. In this case, although there is advantage in that the mobile node may use a conventional procedure that registers the mobile node as a normal home agent, all the home agent, the GFA, the foreign agent need to recognize that there is an address of the GFA in an extension field of a registration request message and also need to be capable of processing the address. Additionally, in a case of when the mobile node is not registered, when a deny message of binding update is received, the processes of generating and adding a new visitor entry to a visitor list inside the GFA before receiving a response message for the registration request from the home agent need to be erased again. Furthermore, in a case of when the reply of the registration request is late from the home agent, if the mobile node moves to another foreign agent region for the mean time and then again requests registration, the GFA already exists in the visitor list. As a result, it may be venerable to malicious attack because the GFA may deliver information when the mobile node is not actually registered. Furthermore, because all data packets always pass through the GFA, the load of the data delivery path may increase.

DISCLOSURE

Technical Problem

An aspect of the present invention provides a mobile network system capable of processing a high-speed handoff by dividing into a data packet path between mobile nodes and a handoff packet path of the mobile node, and a method for processing IP handoff thereof.

Technical Solution

According to an aspect of the present invention, there is provided a mobile network system comprising: a plurality of mobile agents operating as a home agent with respect to a service-subscribed mobile node, and operating as a foreign agent with respect to a mobile node service-subscribed to another mobile agent and moving into a its own mobile network region, such that data is delivered between the mobile node and a correspondent mobile node in administrating mobile network region, respectively; and a mobile agent platform including a signal path for processing handoff of the mobile agents and the mobile node, and relaying a handoff registration request message and a handoff registration response message between a mobile agent operating as a home agent with respect to a mobile node and a mobile agent operating as a foreign agent with respect to a mobile node through the signal path.

According to another aspect of the present invention, there is provided a method for processing handoff in a mobile network system with a plurality of mobile agents operating as a home agent and a foreign agent and a mobile agent platform, the method comprising: receiving a handoff registration request message of a mobile node from a mobile agent; determining whether an entry of the registration-requested mobile node is in a visitor list or not; updating a corresponding entry based on contents of the received message if the entry is in the visitor list; adding an entry of a corresponding mobile node to a temporary list by copying the received message if the entry is not in the visitor list; and after performing the updating and the adding, delivering the received handoff registration request message in to a mobile agent corresponding to a home agent of a corresponding mobile node.

The method may further comprising: receiving a handoff registration response message from a mobile agent by the mobile agent platform; erasing a corresponding entry from the temporary list and updating the corresponding entry in the visitor list based on the received handoff registration response message; and delivering the received handoff registration response message into a mobile agent corresponding to a foreign agent of a corresponding mobile node.

According to another aspect of the present invention, there is provided a method of processing handoff in a mobile network with a plurality of mobile agents operating as a home agent and a foreign agent and a mobile agent platform, the method comprising: receiving a handoff registration request message from the mobile agent platform; determining whether handoff registration with respect to a registration-requested mobile node is permitted or not; generating an entry for a corresponding mobile node in a visit list and copying a CoA and an IP address of a foreign agent from the message if the registration is permitted; and generating a handoff registration response message with the determination result of whether the registration is permitted or not to deliver it to the mobile agent platform.

According to another aspect of the present invention, there is provided method of processing handoff in a mobile network with a plurality of mobile agents operating as a home agent and a foreign agent and a mobile agent platform, the method comprising: receiving a handoff registration request message; adding an entry of a corresponding mobile node to a temporary list and erasing an entry of a corresponding mobile node from a visitor list if the handoff registration request message is transmitted from the mobile agent platform; and delivering the handoff registration request message into the mobile agent platform if the handoff registration request message is not transmitted from the mobile agent platform.

Advantageous Effects

As described above, according to the present invention, the message for the handoff process is delivered using the HAAP or the VPN between the mobile agents and the MAP through a path that is physically different from a data path. Therefore, limitation in a head of line can be resolved and the IP handoff can be promptly provided, such that seamless communication services can be provided.

Additionally, unlike a conventional method using the GFA, the present invention delivers the contents of the intact registration request message, which is transmitted from the foreign agent, into the home agent. Such that the conventional mobile node can be directly applied to the present invention as it is.

DESCRIPTION OF DRAWINGS

The above and other aspects, features and other advantages of the present invention will be more clearly understood from the following detailed description taken in conjunction with the accompanying drawings, in which.

BEST MODE

Figure 1:
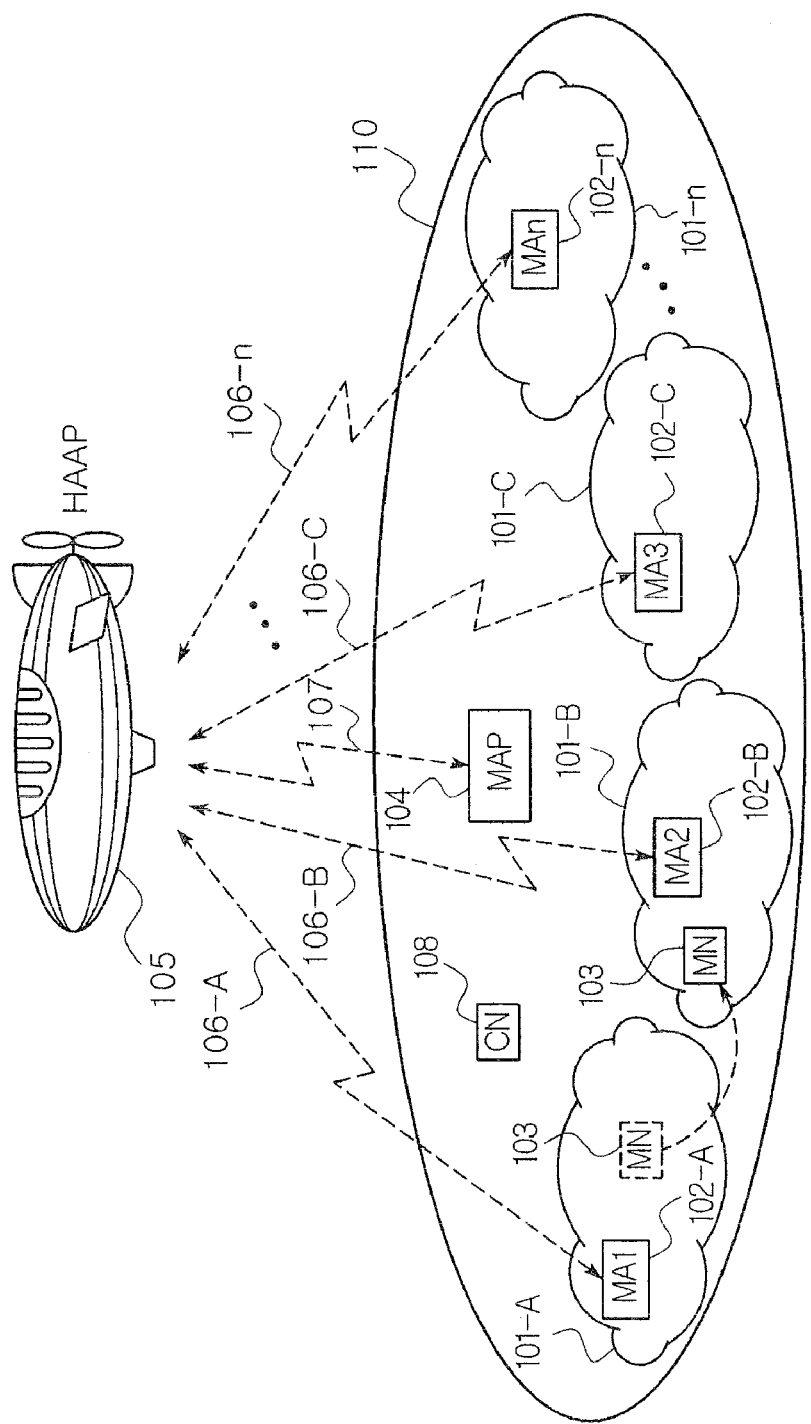
FIG. 1 is a block diagram illustrating a mobile network system according to an embodiment of the present invention.

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Further, the present invention is only defined by scopes of claims. Therefore, in some embodiments, well-known processes, device structures, and technologies will not be described in detail to avoid ambiguousness of the present invention. An embodiment described and exemplified herein includes a complementary embodiment thereof.

Like reference numerals refer to like elements throughout the drawings.

It will be understood that although the terms first and second are used herein to describe various elements, these elements should not be limited by these terms. These terms are only used to distinguish one element from another element. It will also be understood that when a portion is referred to as being connected to another portion, it can be directly connected to another portion, or electrically connected to another portion with intervening devices. Furthermore, it will also be understood that when term 'including' may further include other components, if there is no specific mention, without excluding other components.

Referring to "Establishing wireless communications service via high-altitude aeronautical platforms"(IEEE Comm. Magazine, Vol. 35, Issue 9, pp 128-135, 1997, September, 2007) and "The future generation of mobile communications based on broadband access technologies," (IEEE Comm. Magazine, Vol. 38, Issue 12, pp 134-142, December, 2000) and "A Mobility Management Protocol for IP-Based cellular networks," (IEEE Wireless Communications, pp 31-37, Vol. 9, issue 3, June, 2002), when a high-altitude aeronautical platform (HAAP) in the stratosphere is used for communications, information transmission delay is short because the HAAP's altitude is below 50 Km (typically between 20 and 30 Km), and also a broadband information transmission is possible because a frequency band is much higher than 2 GHz, i.e., a frequency band of a general mobile communication.

This invention applies the above information to high-speed handoff in the mobile IP communication. According to the present invention, a delivery path of data packets between mobile nodes (mobile nodes) on the ground with the home agent and a foreign agent (foreign agent) employs a conventional network, and a path of signal packets for processing the IP handoff of the mobile node utilizes the HAAP and mobile agent platform (MAP) or a virtual private network (VPN) between the mobile agents and the MAP. That is, there are two paths such as a data packet path and a signal packet path for processing handoff. Additionally, in a case of using the VPN, a conventional mobile IP signal method is used, such that the data packets do not pass through a gate way foreign agent (GFA). As a result, the IP handoff can be processed more easily and faster.

Exemplary embodiments of the present invention will now be described in detail with reference to the accompanying drawings.

FIG. 1 is a block diagram illustrating a mobile network system according to an embodiment of the present invention when a mobile node moves from a network of a home agent into a network of a foreign agent.

Referring to FIG. 1, a numerical reference 104 represents a MAP that processes a handoff message between a plurality of mobile agents. A numerical reference 105 represents a HAAP in the stratosphere for relaying communications. A numerical reference 110 represents a region where one MAP 104 administrates through the HAAP 105. Numerical references 101-A through 101-n represent a mobile network in the region 110. Numerical references 102-A and 102-B represent mobile agents operating as a home agent and a foreign agent to allow continuous communications by managing position information of a moving mobile node in each of the mobile networks 101A through 101-n. A numerical reference 103 represents a service-registered mobile node of the mobile agent1 102-A, which moves to another network 101-B.

As described above, the mobile agent 102-A becomes the home agent of the mobile node 103, and the mobile agents 102B through 102n become foreign agents of the mobile node 103.

Furthermore, the numeral reference 108 represents a correspondent node that may be another node placed in an administration district of the MAP 104, or may be connected to Internet.

Moreover, the numerical references 106A through 106n represent mobile links that are respectively connected between the mobile agents 102A through 102-n and the HAAP 105 to exchange handoff messages. The numerical reference 107 represents a mobile link between the HAAP 105 and the MAP 104.

Using the mobile node as a point of reference, a network where a home agent with the mobile node subscribed to a service exists is called a home network, and a network where a foreign agent of the mobile node exists is called a visit network.

Figure 2:
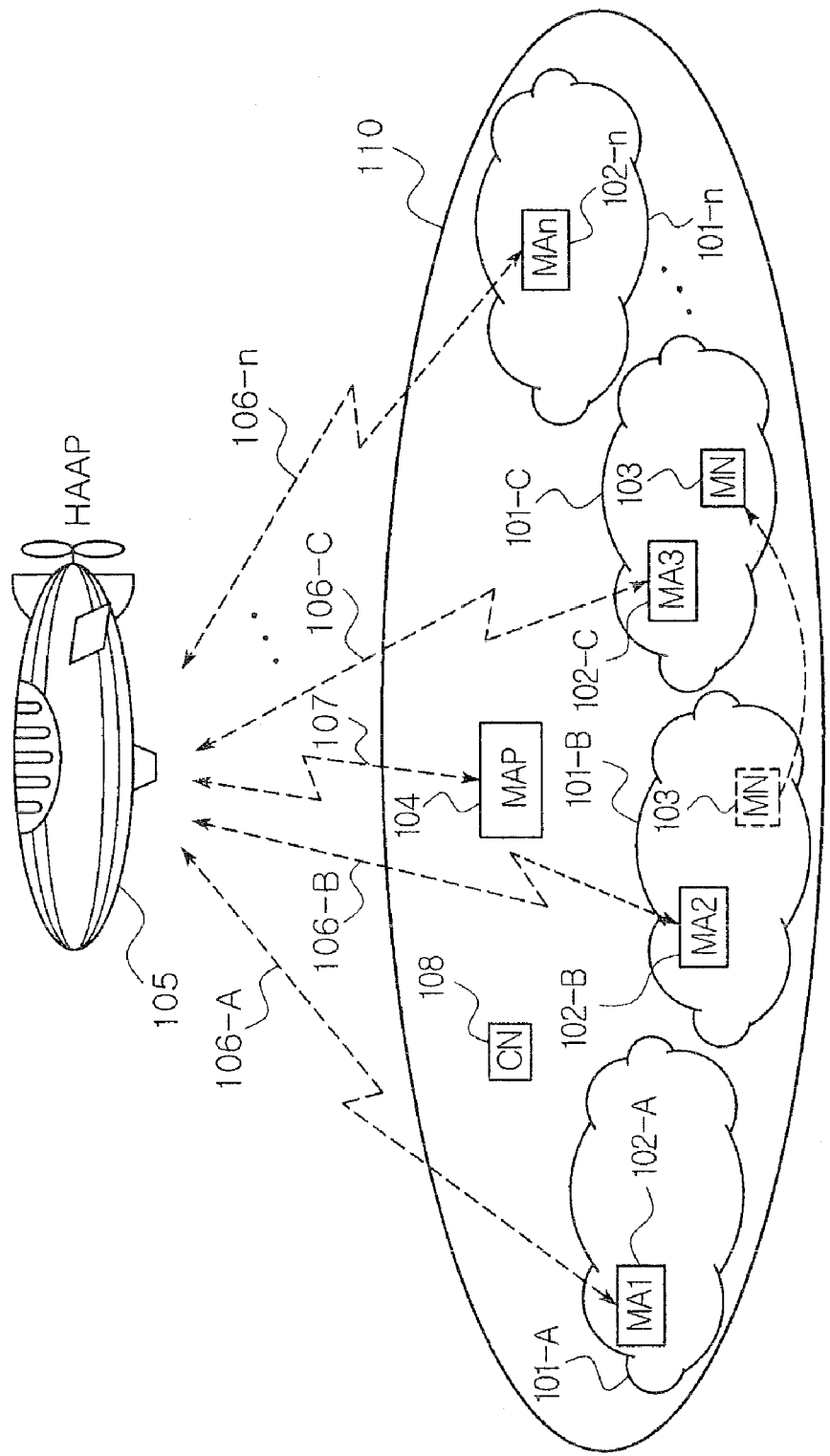
FIG. 2 is a block diagram illustrating when a mobile node moves from one visit network to another visit network in the mobile network system of FIG. 1.

FIG. 2 is a block diagram illustrating when the mobile node 103 is moves from one visit network 101-B to another visit network 101-C in the mobile network system of FIG. 1.

Referring to FIGS. 1 and 2, handoff messages between each of mobile agents 102A through 102-n are delivered through the mobile links 106A through 106n, and 107, which are physically distinguishable from a path of general data packets, by the MAP 104 and the HAAP 105.

Figure 3:
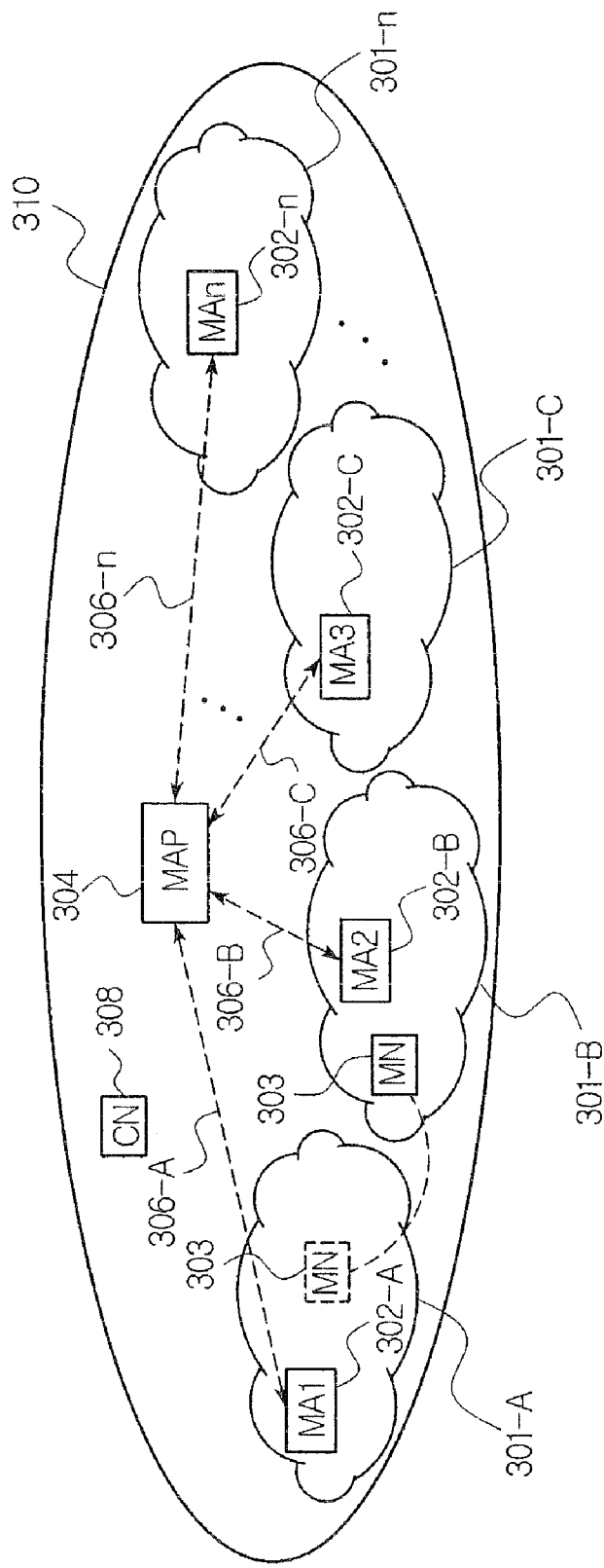
FIG. 3 is a block diagram illustrating a mobile network system according to another embodiment of the present invention.

FIG. 3 is a block diagram illustrating a mobile network system according to another embodiment of the present invention.

Referring to FIG. 3, numerical references 301-A through 301-n represent a plurality of mobile networks, e.g., home networks. Numerical references 302-A through 302-n represent mobile agents operating as a foreign agent or a home agent by processing handoff of a mobile node to allow a continuous IP communication in each of the mobile networks 301-A through 301-n. A numerical reference 303 represents a service-registered mobile node of the mobile agent1 302-A, which moves to another network 301-B. A numerical reference 304 represents a MAP processing signals for handoffs between the mobile agents 302-A and 302-n. Numerical references 306-A through 306-n represent links using a VPN between the MAP 304 and the mobile nodes 302-A through 302-n. A numerical reference 308 represents a correspondent node exchanging data packet with the mobile node 303. A numerical reference 310 represents a region where the MAP 304 controls. That is, the mobile networks 301-A through 301-n are included in the region of the MAP 304.

As described above, the mobile agent 301-A becomes a home agent of the mobile node 303, and the mobile agent 302-B becomes a foreign agent of the mobile node 303.

Figure 4:
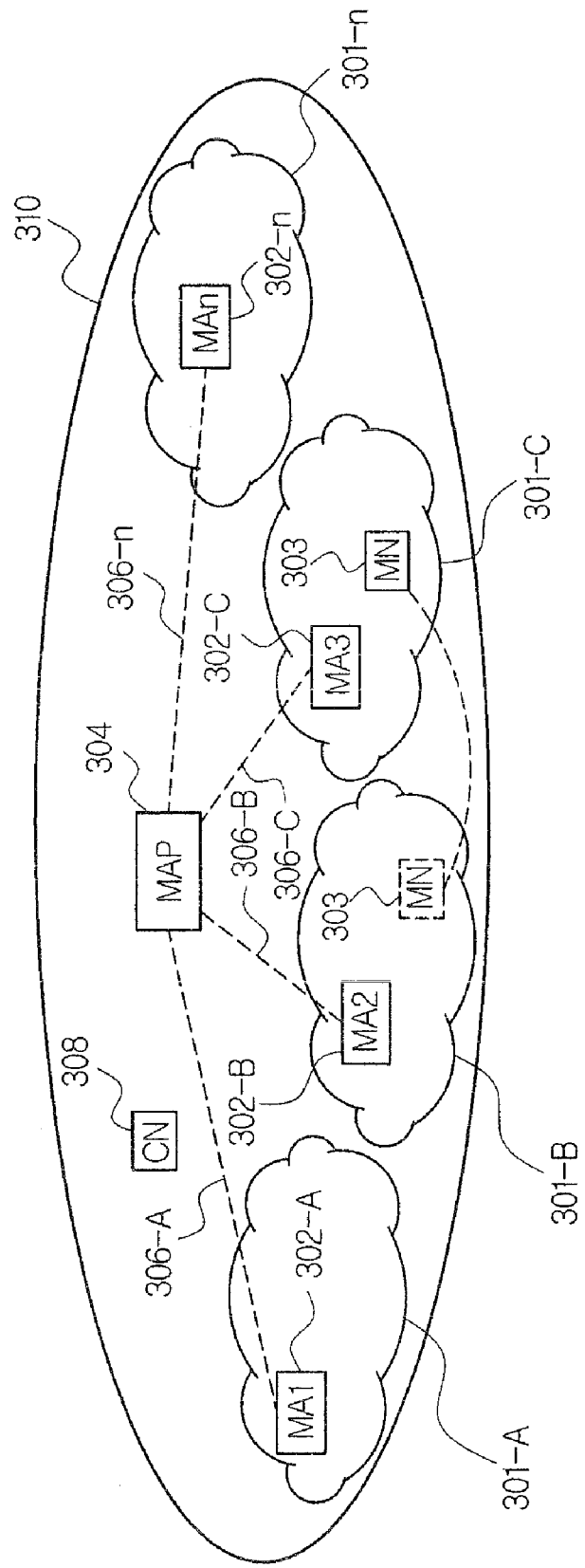
FIG. 4 is a block diagram illustrating when a mobile node moves from one visit network to another visit network in the mobile network system of FIG. 3.

FIG. 4 is a block diagram illustrating when a mobile node is moves from one visit network to another visit network in the mobile network system of FIG. 3. In FIG. 3, the mobile node 303 moves from a network of the mobile agent2 302-B into a network of the mobile agent3 302-C.

Referring to FIGS. 3 and 4, the handoff signal packet between the mobile agents 302-A through 302-n is transmitted through VPN links 306-A through 306-n that are physically distinguishable from conventional data packet paths by the MAP 304.

According to a network structure in FIGS. 1 through 4, when each of the mobile agents 102-A through 102-n and 302-A through 302-n operates as a foreign agent, that is, the mobile node that is not registered as a service subscriber in its network sends a registration message, and then the registration request message is delivered to the MAPs 104 and 304 instead of sending all the registration request message into the home agent of the mobile node. Additionally, all replies for registration request message of the mobile node are delivered into the MAP.

Figure 5:
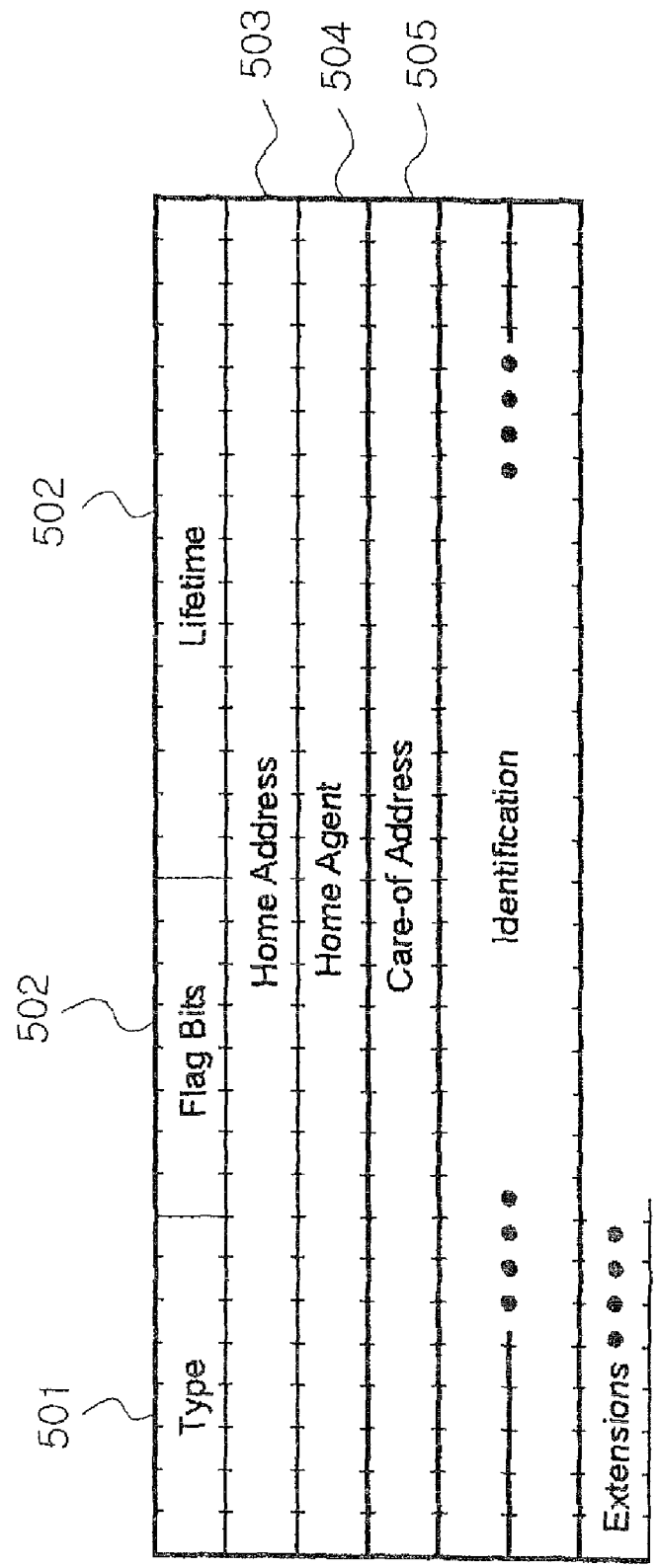
FIG. 5 is a structure of an IP handoff registration request message according to an embodiment of the present invention.

FIG. 5 is a structure of an IP handoff registration request message delivered by the MAPs 104 and 304 according to an embodiment of the present invention.

Referring to FIG. 5, the handoff registration request message includes a type field 501, a flag field 502, a lifetime field 503, a home address field 504, a home agent field 505, and a care-of-address (CoA) field 506. Its format is identical to that of a conventional art. A value of the lifetime field 503 can be modified by the home agent.

Referring to FIGS. 6 through 10, a method for processing handoff in the mobile network structure will be described.

Figure 6:
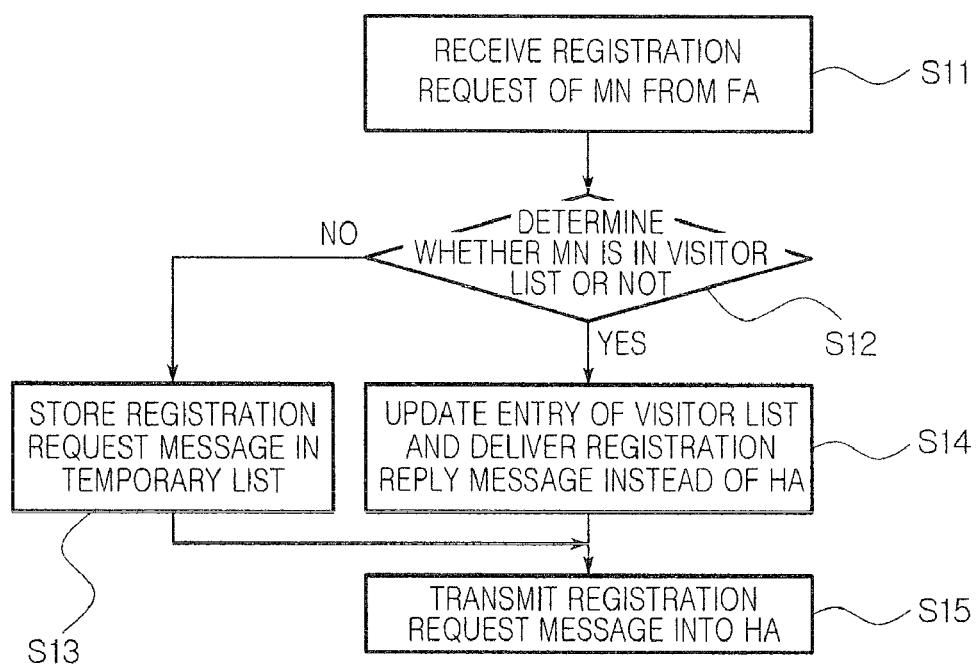
FIG. 6 is a flowchart illustrating a method for processing IP handoff in a mobile agent platform according to an embodiment of the present invention.
Figure 6:
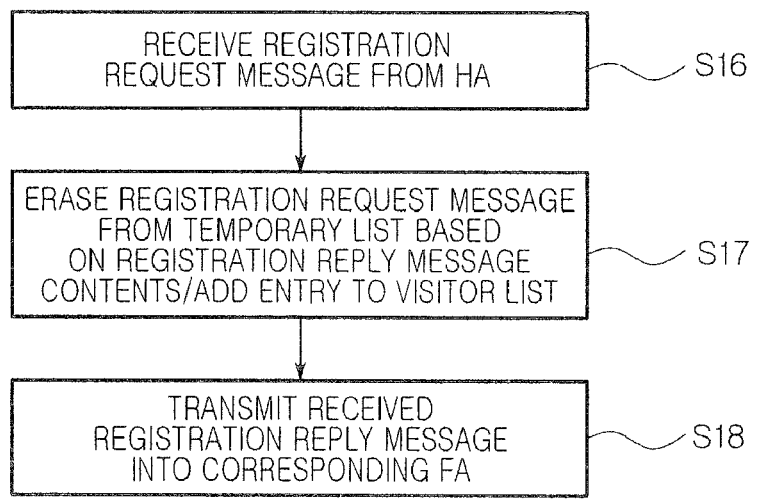

FIG. 6 is a flowchart illustrating a method for processing IP handoffs in MAPs 104 and 304 according to an embodiment of the present invention.

Referring to (a) of FIG. 6, the MAP receives a handoff registration request message for a mobile node, which visits its own network, from a mobile agent operating as a foreign agent in operation S11.

When the MAP receives the handoff registration request message, it is determined whether there is a mobile node requesting the handoff registration in a visitor list that manages information of mobile nodes permitted for handoff registration in operation S12.

According to the determination result, if an entry of the mobile node does not exist in the visitor list, the handoff registration request message is delivered into the mobile agent corresponding to the home agent after the received handoff registration request message is copied into a temporary list managing handoff information of the mobile node requesting registration in operation S13.

On the contrary, according to the determination result, if the entry of the mobile node exists in the visitor list, the CoA of the entry is corrected by referring to the registration request message. Then, a handoff registration response message is generated, and the generated handoff registration response message is transmitted to the mobile agent that sends the registration request message instead of a home agent of the mobile node in operation S14. In operation S15, the received handoff registration request message is transmitted to the mobile agent corresponding to the home agent of the mobile node.

Here, the temporary list and the visitor list are provided to manage the handoff process in the MAP. Each entry of the temporary list copies the received handoff registration request message as it is, and each entry of the visitor list includes a CoA and a lifetime for the mobile node permitted for registration.

Referring to (b) of FIG. 6, the MAP receives the handoff registration response message from the mobile agent corresponding to the home agent of the mobile node in operation S16.

The handoff registration response message includes a determination result of whether permission for the handoff registration request is granted or not, and the MAP refers to the contents of the received handoff registration response message to erase the handoff registration request message for the mobile node from the temporary list or move the entry for the mobile node from the temporary list into the visitor list in operation S17. Then, the received handoff registration response message is sent to the mobile agent operating as the foreign agent of the mobile node in operation S18.

According to the above description, the mobile node can perform a handoff procedure in the same way of a conventional procedure, and can transmit the handoff message through another path different from the data path. As a result, head-of-line blocking phenomenon does not occur, and handoff can be processed at high speed.

Figure 7:
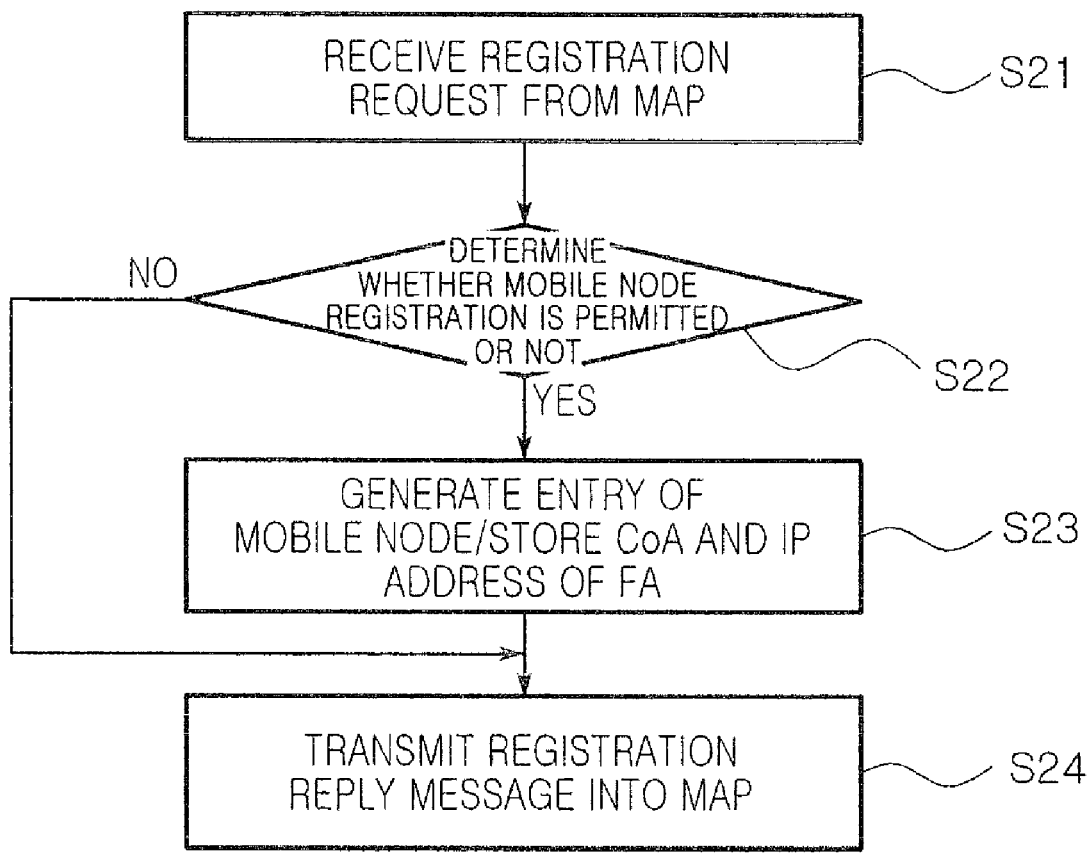
FIG. 7 is a flow chart illustrating a method for processing IP handoff when operating as a home agent in a mobile agent according to another embodiment of the present invention.

FIG. 7 is a flowchart illustrating a method for processing IP handoff in a mobile agent corresponding to a home agent of a mobile node with handoff, and especially, a case of when the mobile agent is placed on an administration district of the MAP.

Referring to FIG. 7, the mobile agent in the administration district of the MAP receives a handoff registration request message, with respect to the mobile node resisted to the mobile agent as a subscriber, from the MAP in operation S21.

When receiving the handoff registration request message, it is determined whether the registration for a corresponding mobile node is permitted or not in operation S22.

If the registration is rejected, the handoff registration response message including rejection contents is delivered into the MAP in operation S24. On the contrary, when the registration is permitted, an entry is generated to manage handoff information of the mobile node in a visit list, and a CoA of the visit network and an IP address of the mobile agent that the mobile node visits are stored in the entry in operation S23. Then the handoff registration response message including the registration contents for permission is generated and delivered into the MAP in operation S24.

According to the above description, an operation of the mobile agent that functions as a home agent is identical to that of the conventional mobile agent except that receiving and transmitting of the handoff registration request message of the mobile node are performed with the MAP not another mobile agent. Accordingly, this can be simply applied to the conventional mobile agent.

Figure 8:
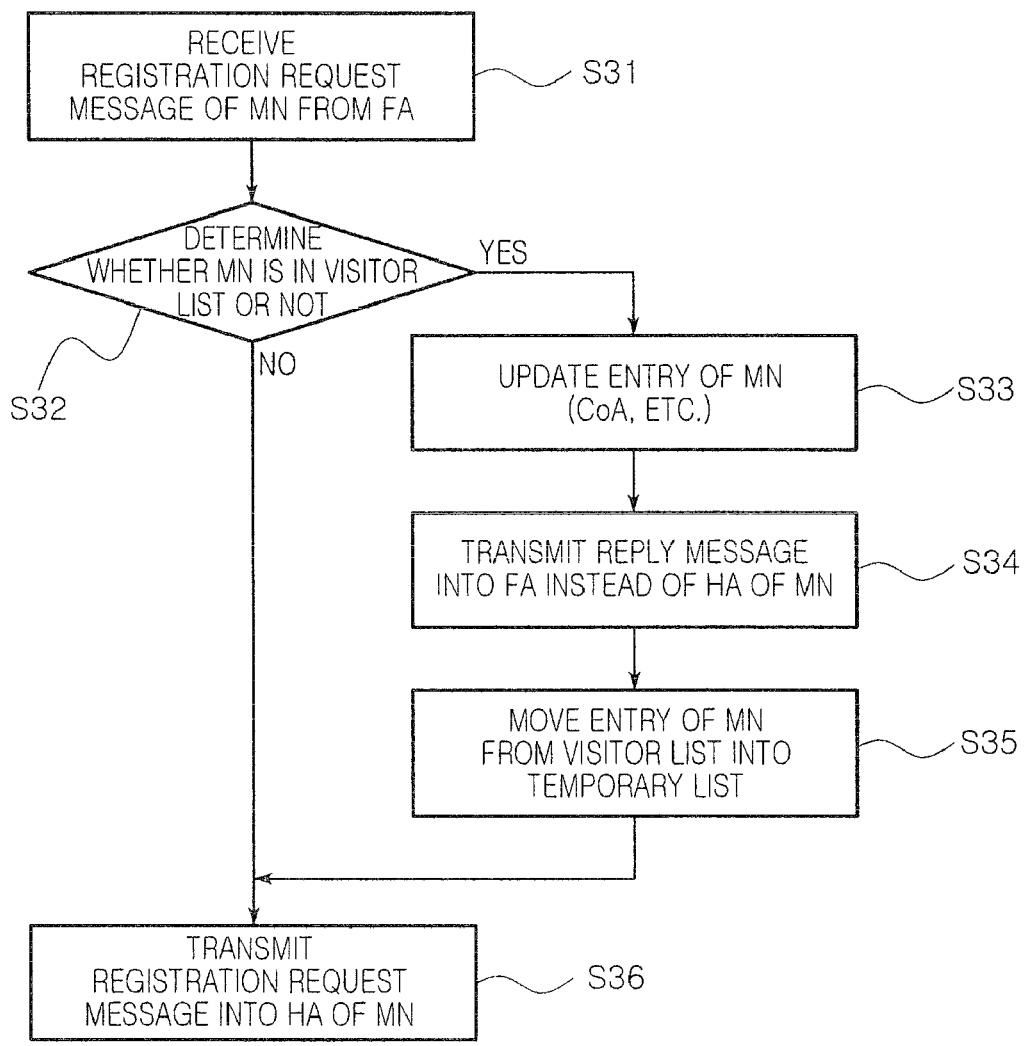
FIGS. 8 and 9 are flowcharts illustrating a method for processing IP handoff in a mobile agent platform according to further another embodiment of the present invention.
Figure 9:
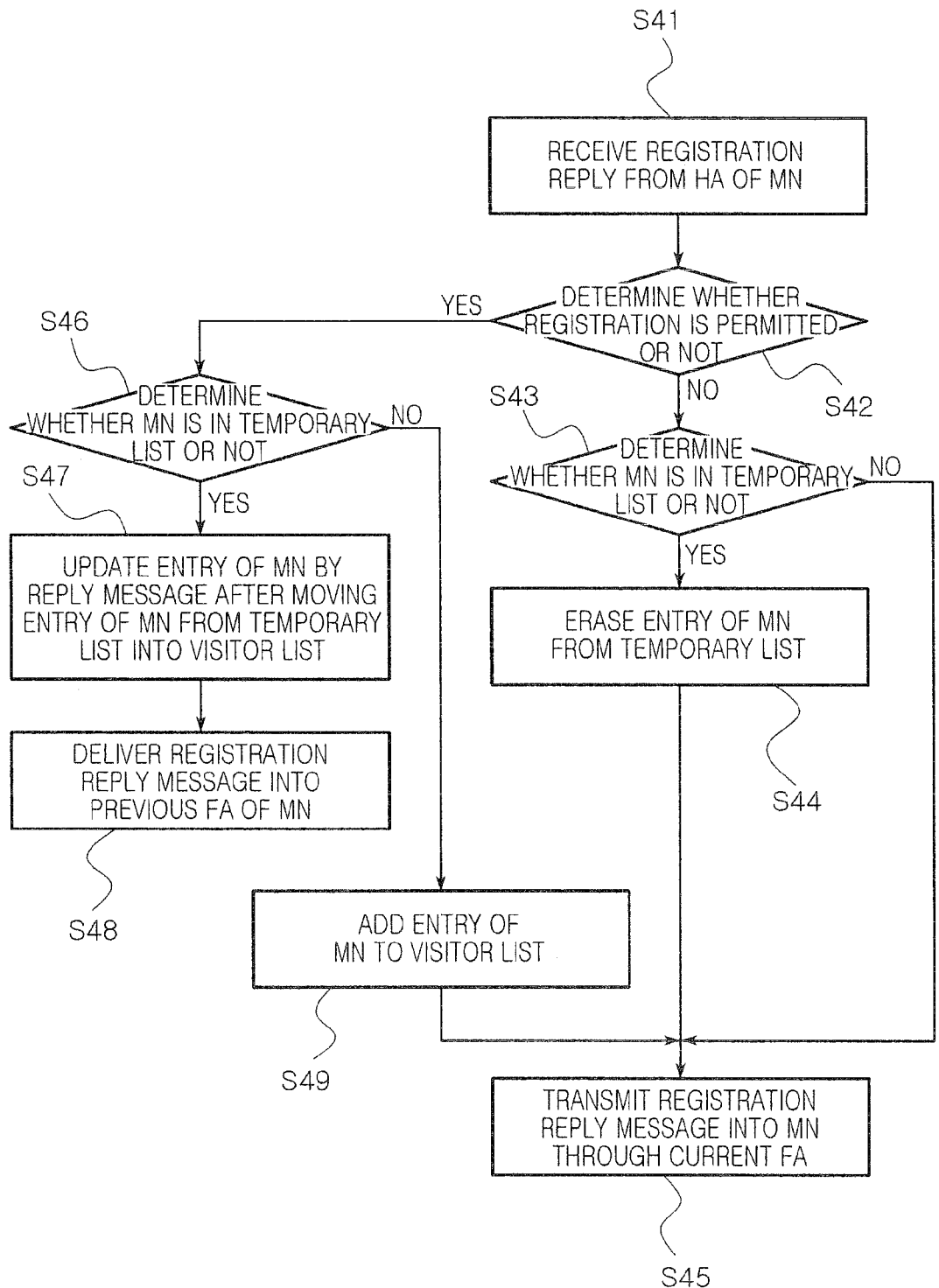

FIGS. 8 and 9 are flowcharts illustrating a method for processing IP handoff in a MAP according to another embodiment of the present invention. FIG. 8 illustrates when processing a handoff registration request, and FIG. 9 illustrates when processing a handoff registration reply.

According to an embodiment of the present invention, the MAP includes a visitor list for mobile nodes permitted for registration and a temporary list for mobile nodes requesting registration, to process IP handoff for the mobile node.

Referring to FIG. 8, the MAP of the present invention receives the handoff registration request message for the mobile node from the mobile agent operating as a foreign agent with respect to a predetermined mobile node in operation S31.

As described in (a) of FIG. 6, it is determined whether the mobile node requesting handoff registration is in the visitor list or not in operation 32.

According to the determination result, if the entry of the mobile node exists in the visitor list, the entry of the mobile node is updated (e.g., the CoA is corrected) in operation S33. After generating the handoff registration response message not by the home agent of the mobile node, and delivering it to the mobile agent that sends the handoff registration request message in operation S34, the entry of the mobile node moves from the visitor list to the temporary list in operation S35. The received handoff registration request message is transmitted to the mobile agent corresponding to the actual home agent in operation S36.

On the contrary, if there is not an entry of a mobile node requesting registration in the visitor list of the MAP in the operation S32, the handoff registration request message is delivered into the home agent of a corresponding mobile node in operation S36 without performing the operations S33 through S35.

The reply of the processed handoff registration request is processes as illustrated in FIG. 9.

Referring to FIG. 9, the MAP receives a response message with respect to the IP handoff registration of the mobile node from the home agent that receives the handoff registration request message in operation S41.

It is determined whether the handoff registration is permitted or not with reference to the received handoff registration response message in operation S42.

According to the determination result, when the handoff registration of the mobile node is rejected, it is determined whether the entry for the mobile node is in the temporary list in the MAP in operation S43. If there is the corresponding entry in the temporary list, the entry is eased in operation S44, and then the handoff registration response message is sent to the mobile node through a current foreign agent of the mobile node in operation S45. If there is not corresponding entry in the temporary list, the operation S45 is performed.

According to the determination result in the operation S42, if the handoff registration of the mobile node is permitted, it is determined whether the entry of the corresponding mobile node is in the temporary list in operation S46. If the entry is not in the temporary list, the entry of the mobile node is added to the visitor list, and then the operation S45 is performed. On the contrary, if the entry of the mobile node is in the temporary list, the corresponding entry of the temporary list is sent to the visitor list and is updated in operation S47. Then, the handoff registration response message is transmitted to the previous foreign agent of the mobile node in operation S48.

According to the above process, when the mobile node moves from one visit network to another visit network, handoff can be promptly processed.

Additionally, the MAP reduces a lifetime at each entry in its visitor list in the same of the conventional method, and erases the entry of the mobile node with the expired lifetime from the visitor list. Furthermore, the lifetime is updated based on the contents of a corresponding message of the handoff registration request.

Figure 10:
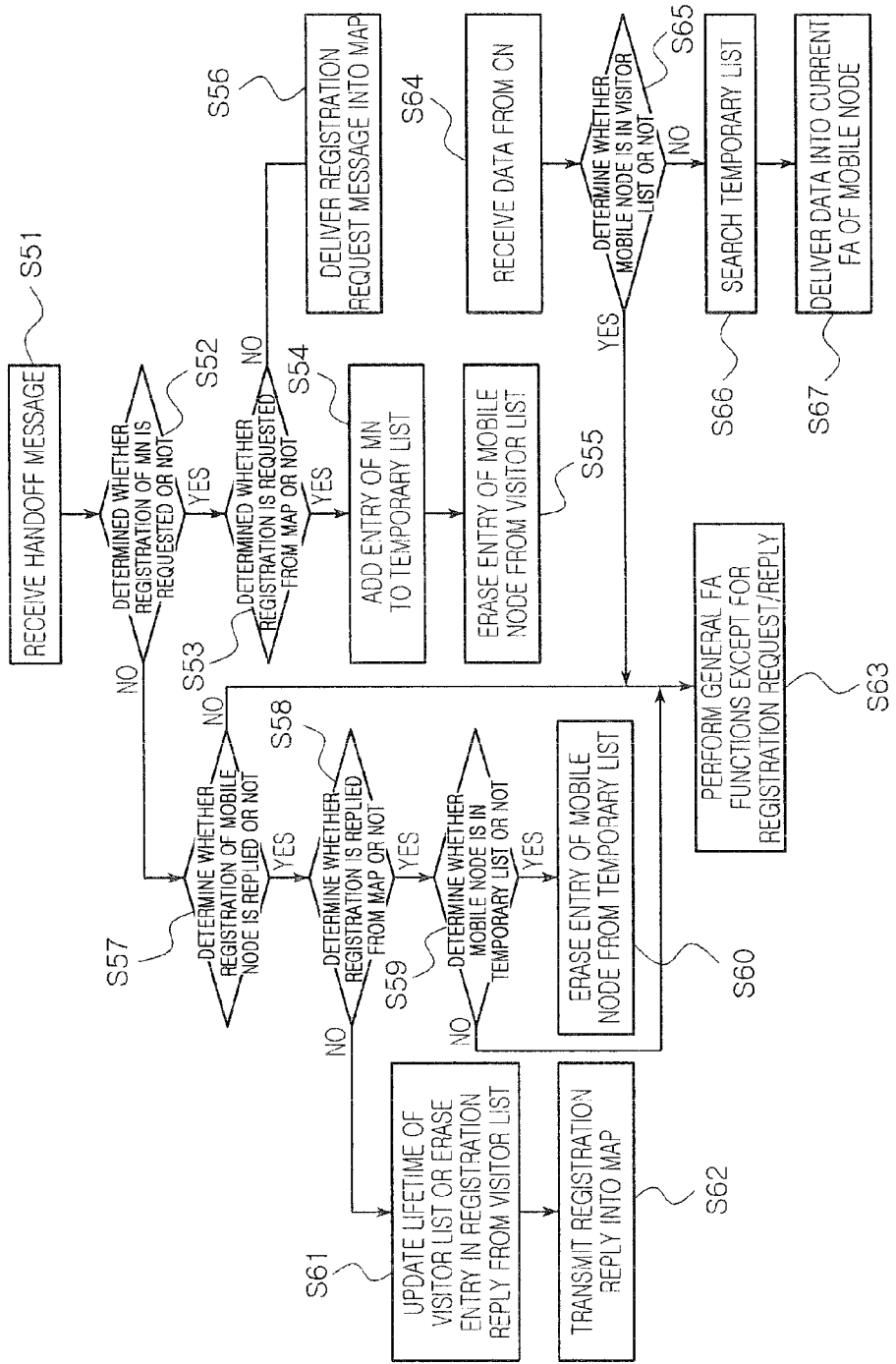
FIG. 10 is a flow chart illustrating a method for processing IP handoff when operating as an foreign agent in a mobile agent according to an embodiment of the present invention.

FIG. 10 is a flow chart illustrating a method for processing IP handoff when a mobile agent operates as a foreign agent in a mobile agent according to an embodiment of the present invention.

According to an embodiment below, the mobile agent includes a temporary list managing the handoff registration request, and a visitor list managing mobile nodes that visit its own network and are permitted for handoff registers, in order to operate as the foreign agent.

Referring to FIG. 10, when operating as the foreign agent, the corresponding mobile agent receives an IP handoff message including handoff registration request message and the handoff registration response message from the MAP and the mobile node that moves into its own network region in operation S51.

When the mobile agent receives the IP handoff message, it is determined whether the received message is the handoff registration request message for the mobile node or the handoff registration response message, and whether the message transmitted from the MAP or not in operations S52, S53, S57, and S58.

According to the determination result, if the received message is the handoff registration request message with respect to a mobile node, which is transmitted from the MAP, the received message is copied for adding the entry of the registration-requested mobile node to the temporary list, and the entry of the corresponding mobile node is erased from the visitor list in operations S54 and S55.

Unlike the above operation, if the handoff registration request message is for a predetermined mobile node and is not transmitted from the MAP, the received handoff registration request message is delivered into the MAP as it in operation S56.

Additionally, if the message is the handoff registration response message for the predetermined mobile node, which is transmitted from the MAP, it is determined whether the entry of the corresponding mobile node is in the temporary list or not in operation S59. If there is the entry in the temporary list, the corresponding entry is erased in operation S60. If the registered mobile node is not in the temporary list, a general function is performed as the foreign agent according to the received message in operation S63.

Additionally, when the received message is the handoff registration response message but is not transmitted from the MAP, general handoff registration reply processes are performed as the foreign agent, such as updating the lifetime of the corresponding entry in the visitor list and erasing an entry of the registration reply from the visitor list in operation S61. The received handoff registration response message is delivered to the MAP in operation S62.

Lastly, when the received message is not the handoff registration request message and not the handoff registration response message, general functions of the foreign agent are performed according to the received message in operation S63.

Additionally, the mobile agent operating as the foreign agent can receive data packet that is transmitted from a correspondent node of the mobile node that is permitted for the handoff registration request to the mobile node in its own visit network as described above in operation S64.

As described above, when receiving a data packet from the correspondent node, it is confirmed whether the mobile node corresponding to the destination of the data packet is registered in its own visitor list in operation S65. If the mobile node is in the visitor list, general functions of a foreign agent are performed to deliver the received data into the corresponding mobile node in operation S63.

On the contrary, according to the determination result in operation S65, if the mobile node is not in the visitor list, it is confirmed that the corresponding mobile node is in the temporary list in operation S66, and then the received data is delivered into a current foreign agent of the searched mobile node in operation S67.

As described above, the foreign agent exchanges the handoff message with the home agent of the corresponding mobile node through the MAP. Therefore, the handoff process can be promptly performed.

Furthermore, as described in the operation of the foreign agent, the data packets except the handoff signal packet between the correspondent node and the mobile node are directly delivered through a data path between the home agent and the mobile agent, not through the MAP.

Accordingly, an IP handoff procedure in a mobile network structure with the above mobile agent and the MAP is as follows.

Figure 11:
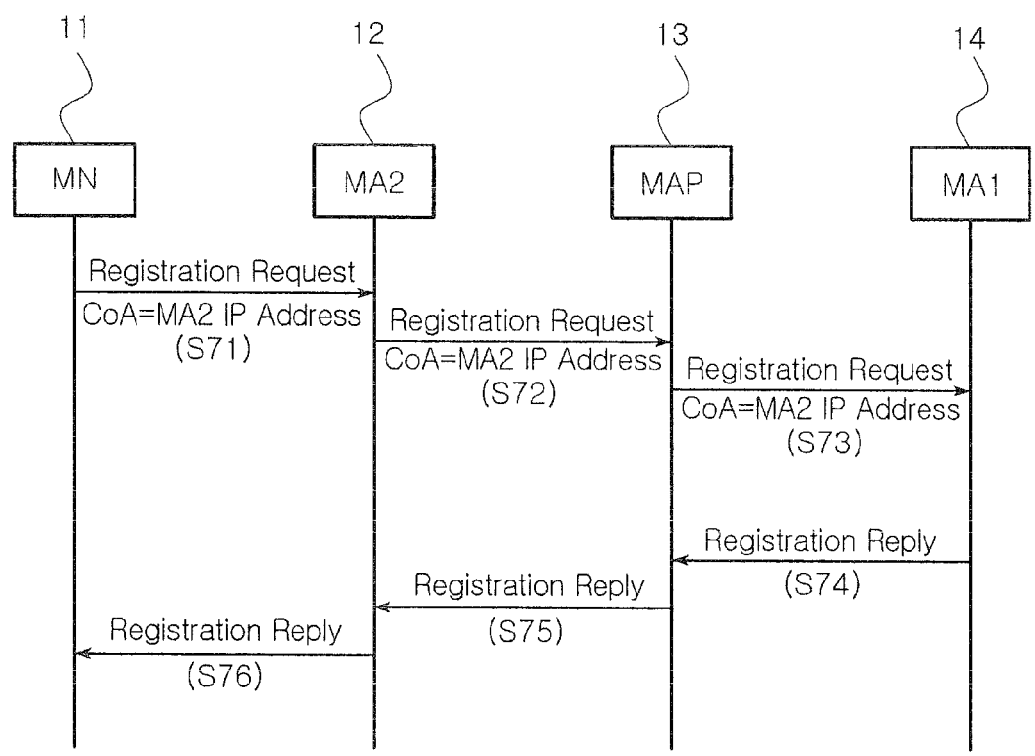
FIG. 11 is a handoff message flowchart in a mobile network system according to an embodiment of the present invention.

FIG. 11 is a handoff message flowchart in a mobile network according to an embodiment of the present invention. As illustrated in FIGS. 1 through 3, it shows a procedure of when a mobile node moves from a home network to a visit network, i.e., when a corresponding mobile node is not registered in a visitor list in the MAPs 104 and 304.

Referring to FIG. 11, when a mobile node 11 that first moves from a home network to an arbitrary visit network sends a handoff registration request to the mobile agent2 12 in a corresponding visit network in operation S71, since the mobile agent2 12 is not registered to its network service, the hand off registration request message is delivered into the MAP 13 as it is in operation S72. At this point, a CoA of the handoff registration request is an IP address of the mobile agent 12.

Then, the MAP 13 delivers the handoff registration request message received from the mobile agent2 12 into the mobile agent1 14 corresponding to the home agent in operation S73. It is determined whether the handoff registration is permitted or not in the mobile agent1 14, and then the response message with the determination result is transmitted. Then, the MAP 13 receives the response message and delivers it to the mobile node 11 through the mobile agent2 12 in operations S74 through S76.

The delivered handoff registration request signal is in the format of FIG. 5.

As described in FIG. 11, the present invention delivers the handoff registration request message to the home agent as it is through the MAP. On the contrary, when receiving the registration response message from the mobile agent1, i.e., the home agent of the mobile node, this is directly delivered into the mobile node through the mobile agent2 12. As a result, the handoff process can be performed.

Figure 12:
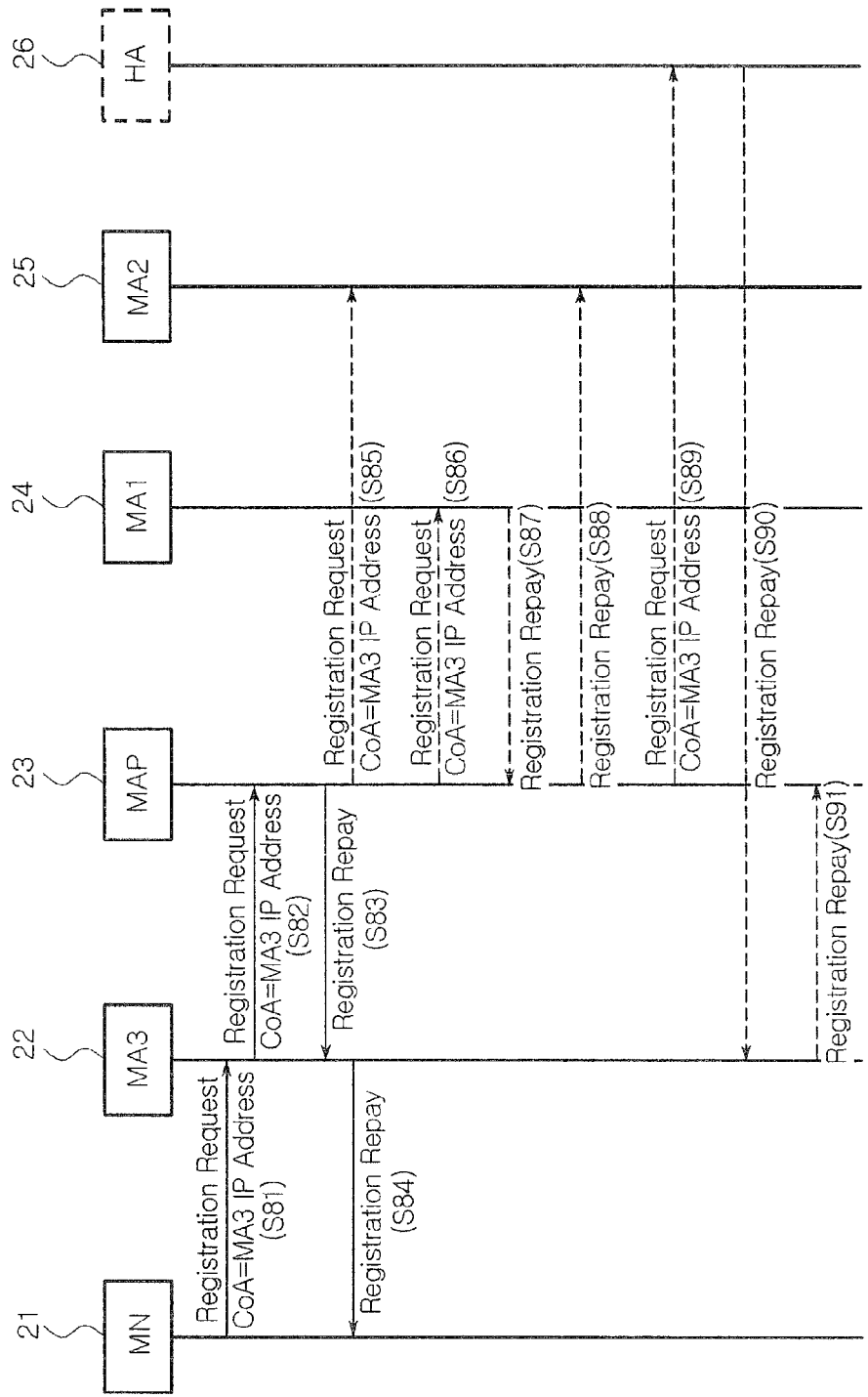
FIG. 12 is a handoff message flowchart in a mobile network system according to another embodiment of the present invention.

FIG. 12 is a handoff process when a mobile node moves from one visit network to another visit network. AT this point, the MAP includes a visitor list with the entry of the mobile node by the processes of FIGS. 6 and 9.

Referring to FIG. 12, when the mobile node 21 using the mobile agent1 24 as the home agent moves from the mobile agent2 25 to the mobile agent3 22, the mobile agent3 22 becomes a current foreign agent that the mobile node 21 visits, and the mobile agent2 25 is the foreign agent that previously exists. Furthermore, reference numeral 26 represents when the home agent of the mobile node 21 is located on the outside of the MAP.

As described above, the mobile node 21 transmits a handoff registration request message to the newly visiting mobile agent3 22 in operation S81, and the mobile agent3 22 delivers this into the MAP 23 in operation S82.

As described above, since the mobile node 21 is registered in the visitor list of the MAP 23, the handoff registration response message that permits the registration is generated and delivered to the mobile agent3 22 in operation S83, and then this is delivered into the mobile node 21 by the mobile agent3 22 in operation S84.

The MAP 23 requests registration to the received home agent. This process is divided into a case of when the home agent is in an administration district of the MAP 23 and a case of when the home agent is in the outside of the administration district.

At this point, when the home agent is the mobile agent1 24 in the administration district, the MAP 23 delivers the intact received handoff registration request message into the home agent1 24, i.e., the home agent, and the mobile agent2 25, i.e., the previous foreign agent in operations S85 and S86. Then, when receiving the registrations response message from the mobile agent1 24, i.e., the home agent, in operation S87, the MAP delivers the registration response message into the previously visited mobile agent2 25 in operation S88. According to the lifetime in the response message, the lifetime information for the mobile node 21 in the MAP is corrected.

Additionally, in a case where the home agent of the mobile node 21 is out of the administration district of the MAP 23, the MAP 23 delivers the received handoff registration request message to the home agent 26 located out of the administration district. Then, the home agent 26 generates the registration response message because there is no additional handoff signal path between the MAP 23 and the home agent 26, and also delivers the registration response message into the mobile agent3 22, i.e., the current foreign agent, in operation S90.

The mobile agent3 22 delivers again the received handoff response message to the MAP 23 because the received handoff response message is not delivered from the MAP 23 in operation S91.

Accordingly, the MAP 23 can continuously manage a current CoA of the mobile node, such that the handoff procedure can be broadcasted.

While the present invention has been shown and described in connection with the exemplary embodiments, it will be apparent to those skilled in the art that modifications and variations can be made without departing from the spirit and scope of the invention as defined by the appended claims.

The invention claimed is:

1. A mobile network system comprising:
a plurality of mobile agents operating as a home agent with respect to a service-subscribed mobile node, and operating as a foreign agent with respect to a mobile node service-subscribed to another mobile agent and moving into a its own mobile network region, such that data is delivered between the mobile node and a correspondent mobile node in administrating mobile network region through a data path, respectively; and
a mobile agent platform including a signal path for processing handoff of the mobile agents and the mobile node, and relaying a handoff registration request message and a handoff registration response message between a mobile agent operating as a home agent with respect to a mobile node and a mobile agent operating as a foreign agent with respect to a mobile node through the signal path.

2. The system of claim 1, wherein the signal path is embodied through a virtual private network.

3. The system of claim 1, wherein the signal path is embodied through a high altitude aeronautical platform (HAAP).

4. A mobile network system comprising:
a plurality of mobile agents operating as a home agent with respect to a service-subscribed mobile node, and operating as a foreign agent with respect to a mobile node service-subscribed to another mobile agent and moving into a its own mobile network region, such that data is delivered between the mobile node and a correspondent mobile node in administrating mobile network region, respectively; and a mobile agent platform including a signal path for processing handoff of the mobile agents and the mobile node, and relaying a handoff registration request message and a handoff registration response message between a mobile agent operating as a home agent with respect to a mobile node and a mobile agent operating as a foreign agent with respect to a mobile node through the signal path, wherein the mobile agent platform comprises:

a temporary list storing information of a mobile node requesting handoff registration; and a visitor list storing information of a mobile node permitted for handoff registration.

5. The system of claim 4, wherein the mobile agent platform determines whether an entry of a corresponding mobile node is in the visitor list or not when receiving a handoff registration request message from the mobile agent, wherein if the entry is not in the visitor list, the mobile agent platform stores the registration request message in the temporary list and then delivers the message to a mobile agent corresponding to a home agent after, and if the entry is in the visitor list, the mobile agent platform updates the corresponding entry of the visitor list platform, delivers a handoff registration response message to a mobile agent corresponding to a foreign agent instead of a home agent, and then delivers the intact handoff registration request message into a mobile agent corresponding to a home agent.

6. The system of claim 4, wherein the mobile agent platform stores a lifetime of each mobile node in the visitor list, and eliminates an entry of a corresponding mobile node from the visitor list when the lifetime is expired.

7. The system of claim 4, wherein when receiving a handoff registration response message from a mobile agent, the mobile agent platform erases a corresponding entry from the temporary list, updates the visitor list based on contents of the message, and transmits the handoff registration response message to a mobile agent corresponding to a foreign agent.

8. The system of claim 7, wherein the mobile agent platform determines whether registration is permitted or not according to the received handoff registration response message, wherein if the registration is permitted, the mobile agent platform adds an entry of a corresponding mobile node to the visitor list, and if the registration is not permitted, the mobile agenet platform erases a corresponding entry from the temporary list without adding the entry to the visitor list.

9. The system of claim 8, wherein the mobile agent platform transmits the handoff registration response message into a mobile agent, i.e., a previous foreign agent of the mobile node, if an entry for a mobile node of the received handoff registration response message is in the temporary list, and transmits the handoff registration response message into a mobile agent corresponding to a current foreign agent if the entry is not in the temporary list.

10. A mobile network system comprising:

a plurality of mobile agents operating as a home agent with respect to a service-subscribed mobile node, and operating as a foreign agent with respect to a mobile node service-subscribed to another mobile agent and moving into a its own mobile network region, such that data is delivered between the mobile node and a correspondent mobile node in administrating mobile network region, respectively; and a mobile agent platform including a signal path for processing handoff of the mobile agents and the mobile node, and relaying a handoff registration request message and a handoff registration response message between a mobile agent operating as a home agent with respect to a mobile node and a mobile agent operating as a foreign agent with respect to a mobile node through the signal path, wherein in a case of operating as a foreign agent, the mobile agent delivers a received handoff registration request message into a mobile agent platform and stores the handoff registration request message in a temporary list when receiving the handoff registration request message of a mobile node moving from another network region.

11. The system of claim 10, wherein in a case of operating as a foreign agent, the mobile agent erases an entry for a corresponding mobile node from the temporary list and adds the mobile node to the visitor list when receiving a handoff registration response message from the mobile agent platform.

12. The system of claim 11, wherein in a case of operating as a foreign agent, the mobile agent delivers a handoff registration response message into a mobile agent platform when receiving the handoff registration response message not from the mobile agent platform.

13. A mobile network system comprising:

a plurality of mobile agents operating as a home agent with respect to a service-subscribed mobile node, and operating as a foreign agent with respect to a mobile node service-subscribed to another mobile agent and moving into a its own mobile network region, such that data is delivered between the mobile node and a correspondent mobile node in administrating mobile network region, respectively; and a mobile agent platform including a signal path for processing handoff of the mobile agents and the mobile node, and relaying a handoff registration request message and a handoff registration response message between a mobile agent operating as a home agent with respect to a mobile node and a mobile agent operating as a foreign agent with respect to a mobile node through the signal path, wherein in a case of operating a home agent, the mobile agent determines whether handoff registration for a corresponding mobile node is permitted or not when receiving a handoff registration request message from a mobile agent platform, and generates an entry of a corresponding mobile node to store a care-of-address (CoA) and an IP address of a foreign agent and generates a handoff registration response message including the determination result of whether registration is permitted or not to deliver it to the mobile agent platform if the handoff registration is permitted.

14. A method for processing handoff by a mobile agent platform in a mobile network system with a plurality of mobile agents and a mobile agent platform, the method comprising:

receiving a handoff registration request message of a mobile node from a mobile agent;

determining whether an entry of the registration-requested mobile node is in a visitor list or not;

updating a corresponding entry based on contents of the received message if the entry is in the visitor list;

adding an entry of a corresponding mobile node to a temporary list by copying the received message if the entry is not in the visitor list; and after performing the updating and the adding, delivering the received handoff registration request message in to a mobile agent corresponding to a home agent of a corresponding mobile node.

15. The method of claim 14, further comprising:

receiving a handoff registration response message from a mobile agent by the mobile agent platform;

erasing a corresponding entry from the temporary list and updating the corresponding entry in the visitor list based on the received handoff registration response message; and delivering the received handoff registration response message into a mobile agent corresponding to a foreign agent of a corresponding mobile node.

16. The method of claim 14, wherein the updating a corresponding entry based on contents of the received message further comprises moving an entry of a corresponding mobile node from the visitor list into the temporary list.

17. The method of claim 16, wherein the updating a corresponding entry based on contents of the received message further comprises transmitting the handoff registration response message into a mobile agent that transmits the handoff registration request message instead of the home agent of the mobile node.

18. The method of claim 15, wherein the erasing a corresponding entry from the temporary list and updating the corresponding entry in the visitor list further comprises:

determining whether handoff registration is permitted or not by referring to the received response message;

determining whether an entry of a mobile node related to the handoff registration response message is in the temporary list or not;

erasing a corresponding entry from the temporary list and adding the corresponding entry to the visitor list if the handoff registration is permitted and the entry of the corresponding mobile node is in the temporary list;

adding a corresponding entry to only the visitor list if the handoff registration of the mobile node is permitted and the entry of the corresponding mobile node is not in the temporary list;

erasing the entry from the temporary list if the handoff registration of the mobile node is not permitted and the corresponding entry is in the temporary list; and not updating the temporary list and the visitor list if the handoff registration of the mobile node is not permitted and a corresponding entry is not in the temporary list.

19. The method of 18, wherein the the delivering the received handoff registration response message comprises delivering the handoff registration response message into a mobile agent corresponding to a previous foreign agent of the mobile node if the registration of the mobile node is permitted and a corresponding entry is in the temporary list.

20. The method of 18, wherein the delivering the received handoff registration response message comprises delivering the response message into a current foreign agent of the mobile node if the registration of the mobile node is not permitted, or if an entry of a corresponding mobile node is not in the temporary list although the registration of the mobile node is permitted.

21. A method of processing handoff by a mobile agent operating as a foreign agent in a mobile network with a plurality of mobile agents and a mobile agent platform, the method comprising:

receiving a handoff registration request message;

adding an entry of a corresponding mobile node to a temporary list and erasing an entry of a corresponding mobile node from a visitor list if the handoff registration request message is transmitted from the mobile agent platform; and delivering the handoff registration request message into the mobile agent platform if the handoff registration request message is not transmitted from the mobile agent platform.

22. The method of claim 21, further comprising:

receiving a handoff registration response message;

determining whether an entry of a corresponding mobile node is in a temporary list or not if the handoff registration response message is transmitted from the mobile agent platform;

erasing a corresponding entry from the temporary list if the entry is in the temporary list;

processing the received registration response message as a foreign agent if the entry is not in the temporary list according to the determination result; and delivering the message into a mobile agent platform after updating the entry of the visitor list if the handoff registration response message is not transmitted from the mobile agent platform.

23. The method of claim 22, further comprising:

receiving data packet from a correspondent node;

determining whether a mobile node, i.e., a destination of the data packet, is in the visitor list or not;

delivering the data packet into a corresponding mobile node if the mobile node is in the visitor list according to the determination result; and delivering the data packet into a current foreign agent of the mobile node by searching the temporary list if the mobile node is not in the visitor list.

* * * * *